(12) United States Patent
Pinchas (10) Patent No.: US 9,333,979 B2
(45) Date of Patent: May 10, 2016

(54) AUXILIARY PUSHER DEVICE

(71) Applicant: Avi Iron Solutions Ltd, Petach Tikva (IL)

(72) Inventor: Avraham Pinchas, Ramat Gan (IL)

(73) Assignee: AVI IRON SOLUTIONS LTD., Petach Tikva (IL)

( * ) Notice: Subject to any disclaimer, the term of this patent is extended or adjusted under 35 U.S.C. 154(b) by 0 days.

(21) Appl. No.: 14/179,588

(22) Filed: Feb. 13, 2014

(65) Prior Publication Data

US 2015/0225008 A1     Aug. 13, 2015

(51) Int. Cl.
| | |
|---|---|
| *B62D 49/06* | (2006.01) |
| *B62B 5/00* | (2006.01) |
| *B62D 5/04* | (2006.01) |
| *B62M 7/14* | (2006.01) |

(52) U.S. Cl.
CPC .............. *B62B 5/005* (2013.01); *B62B 5/0026* (2013.01); *B62B 5/0033* (2013.01); *B62B 5/0063* (2013.01); *B62B 5/0069* (2013.01); *B62D 5/04* (2013.01); *B62M 7/14* (2013.01)

(58) Field of Classification Search
CPC ...... B62B 5/0026; B62B 5/0033; B62M 7/14; B62D 5/04
USPC .......................................................... 180/11
See application file for complete search history.

(56) References Cited

U.S. PATENT DOCUMENTS

| | | | | |
|---|---|---|---|---|
| 4,881,304 A | * | 11/1989 | Colangelo | ........................ 24/511 |
| 5,729,697 A | * | 3/1998 | Schkolnick et al. | ............ 705/23 |
| 5,860,485 A | | 1/1999 | Ebbenga | |
| 6,938,711 B2 | | 9/2005 | Kime et al. | |
| 7,712,558 B2 | * | 5/2010 | Helson et al. | ................ 180/19.3 |
| 7,976,049 B2 | * | 7/2011 | Chiu | .......................... 280/304.1 |
| 8,684,113 B1 | * | 4/2014 | Laconis | .......................... 180/11 |
| 2002/0084116 A1 | | 7/2002 | Ruschke et al. | |
| 2008/0115982 A1 | * | 5/2008 | Lin | ................................. 180/13 |
| 2010/0025124 A1 | * | 2/2010 | Arpino | ......................... 180/19.3 |
| 2010/0326760 A1 | * | 12/2010 | Dugas et al. | .................. 180/335 |

FOREIGN PATENT DOCUMENTS

| | | |
|---|---|---|
| CA | 2277707 | 7/1999 |
| CN | 101367388 | 2/2009 |
| CN | 201745709 | 2/2011 |
| CN | 201932297 | 8/2011 |
| FR | 2856365 | 12/2004 |

\* cited by examiner

*Primary Examiner* — Kevin Hurley
*Assistant Examiner* — Marlon Arce
(74) *Attorney, Agent, or Firm* — JMB Davis Ben-David (57) ABSTRACT

An auxiliary pusher device for pushing a wheeled cart along a surface, the cart equipped with a handle for pushing the cart. The device includes an adjustable length chassis, a grip element connected to the chassis for engaging and gripping the handle of the cart, a drive wheel connected to the chassis, and a motor engaged with the drive wheel. The motor is operative to apply a drive force to the drive wheel, thereby applying a corresponding drive force to the chassis and via the grip element to the cart. The drive force includes a force component substantially parallel to the surface causing the cart to move on the surface. A hand grip is connected to the chassis allowing a user of the device to guide the direction of the cart. A parking station for the device and a method for use of the device is also discussed.

14 Claims, 10 Drawing Sheets

AUXILIARY PUSHER DEVICE

FIELD OF THE INVENTION

The present invention relates to a device for assisting in pushing carts, particularly, but not exclusively, shopping carts.

BACKGROUND OF THE INVENTION

Developments in society have brought about changes in shopping patterns. Shopping for groceries in a leisurely fashion has become a thing of the past. Today families do the bulk of their shopping on a weekly, bi-weekly, or even on a monthly basis and only make supplementary purchases on an as-needed basis. Supermarkets have grown larger, and the increase in their size has made shopping less convenient. This is particularly true for aged and infirm shoppers and as is well-known, the aged is one of the fastest growing demographic groups in many areas of the world.

Differently shaped and configured shopping or grocery carts are known. Such carts are typically offered to the customer by stores to make shopping easier and more convenient. Carts have significantly increased in size over the years. Such larger carts are typically unduly heavy, and may be unstable and unwieldy when loaded, rendering them difficult to push and, at best, clumsy to maneuver.

This problem is aggravated since conventional shopping carts typically use swiveling casters as wheels particularly on the front end of the cart and fixed wheels on the rear end of the cart. This often makes lateral movement of the cart difficult. This feature of many shopping carts is especially burdensome for aged and infirm shoppers. Additionally, basket capacity is much larger than needed for aged shoppers who, on average, have much smaller family sizes. These disadvantages discourage the supplemental shopper from using conventional, large carts, causing some shoppers to elect to hand carry their purchases or use hand baskets. This is usually a much less desirable option for weak or infirm senior citizens and effectively reduces store sales and profits. Moreover it may lead to injuries.

Accordingly, a need exists to ease the use of shopping carts, thereby helping to solve the above problems.

SUMMARY OF THE PRESENT INVENTION

It is an object of the present invention to provide an auxiliary pusher device to assist inter alia the aged and infirm when using carts. Without limiting the types of carts that may be used with the device, these carts may include shopping carts, luggage carts, postal carts, and logistical carts used in many types of industrial installations.

It is another object of the present invention to reduce the risk of potential injuries to cart users.

In is yet another object of the present invention to provide a pusher device which can be used and temporarily borrowed after being automatically charged to an account of an user.

It is a further object of the present invention to provide a parking station, often with recharging capabilities, for the device of the present invention.

It is another object of the present invention to provide a method for use of the device of the present invention.

There is provided in one aspect of the present invention an auxiliary pusher device for pushing a wheeled cart along a travel surface. The cart has rear and front ends and a rearwardly extending handle for pushing the cart. The device comprises an adjustable length chassis having first and second ends and a grip element connected to the first end of the chassis for engaging and gripping the handle of the cart. The device also comprises a drive wheel connected to the second end of the chassis, adapted to frictionally engage the travel surface and a selectably operable motor drivably engaged with the drive wheel. The motor when activated, is operative to apply a drive force to the drive wheel, thereby applying a corresponding drive force to the chassis and via the grip element to the cart, the drive force including a force component substantially parallel to the travel surface, thereby causing the cart to travel along the surface. The pusher device also comprises a hand grip connected to the chassis for guiding the direction of travel of the cart.

In one embodiment of the device, after activating the motor, the device advances in the direction of the cart until touching the cart, thereby causing a component of the drive force to act on the cart.

In yet another embodiment of the device, prior to activating the motor, the chassis length is substantially equal to the perpendicular distance from the handle of the cart to the travel surface.

In a further embodiment of the device, after activating the motor, the length of the chassis is of a varying length depending on the distance the device wheel has advanced in the direction of the cart from its pre-activation position.

In still another embodiment of the device, the device after activation advances in a direction toward the cart resulting in an increase in chassis length and an increase in an angle formed by the chassis length with a perpendicular line from the handle of the cart to the travel surface. The angle and the increased chassis length reach their maximum values when the device touches the cart.

In another embodiment of the device, when the device is activate, the device advances in the direction of the cart until touching it, thereby causing a component of said drive force to act on the cart and while advancing toward the cart there is a resulting increase in the chassis length and an increase in an angle formed by said chassis length with a perpendicular line from the handle of the cart to the travel surface.

In yet another embodiment of the device, the device further comprises a compressive element in mechanical communication with the grip element and operative to exert a force on and releasably engage the grip element with the handle of the cart. In some instances of this embodiment, the compressive element is selected from a group consisting of: a hydraulic piston element, a pneumatic piston element, and a spring.

In still another embodiment of the device, the device further comprises a motor activation and control element in electrical communication with a controller, the motor activation and control element activating, deactivating and modulating the operation of the motor and the speed or power of the device. In some instances of this embodiment, the motor activation and control element is positioned on the hand grip and is a twist grip throttle.

In another embodiment of the device, the device further comprises a braking element in mechanical communication with the drive wheel. The braking element is adapted for preventing rotation of the drive wheel. In some instances of this embodiment, the braking element is positioned on the hand grip and is a braking lever.

In a further embodiment of the device, the adjustable length chassis is formed of upper and lower chassis portions arranged for mutual telescopic adjustment.

In yet another embodiment of the device, the device further comprises a card reader system mounted on the chassis for debiting a user card for use and rental of the device. The card reader may be in communication with a customer account debiting system of a business entity. In some instances of this embodiment, the device further comprises a locking mechanism integrated with the card reader system, wherein when a user card is read by the card reader, the card reader debits the user's customer account for use and rental of the cart. It also releases the device from the locking mechanism freeing the device, thereby permitting its use.

In still another embodiment of the device, the device is in electronic communication with a card reader used in a business entity, wherein when a user card is read by the card reader, the card reader debits an account of the user for use and rental of the cart. In some instances of this embodiment, when a user card is read by the card reader and the user card is debited for use and rental of the cart, the card reader releases the device from a locking mechanism freeing the device and permitting its use.

In another embodiment of the device, the device further comprises a controller and an energy source for providing energy to the motor and the controller. The controller is in electronic communication with the motor, the energy source and a motor activation and control element and the controller controls the motor.

In yet another embodiment of the device, the device further comprises an energy source comprising one or more batteries and a battery tester in electrical communication with the one or more batteries for determining when the one or more batteries need recharging or replacing and indicating such need.

In still another embodiment of the device, the drive wheel is a plurality of drive wheels.

In another aspect of the invention there is provided a system for parking an auxiliary pusher device. The system comprises an auxiliary pusher device as recited above and a parking station. The station comprises walls on three sides configured so that when the pusher device is positioned within the parking station the device is prevented from falling or being knocked over. In some instances of the system the parking station is adapted to connect to an external electric outlet and also, after any necessary voltage conversion by a voltage converter, to connect to an energy source of the pusher device thereby recharging the energy source. In other instances of the system the parking station further comprises a locking mechanism for locking the device. The locking mechanism is released when a user has been charged for use and rental of the device. In yet other instances of the system, the system further comprises a card reader which is adapted to read a card of a user and a locking mechanism for locking the device. The locking mechanism is in electronic communication with the card reader. The device is released for use from the locking mechanism when the card reader reads the card of a user and it has determined that the user has been charged for use and rental of the device.

In yet another aspect of the invention there is provided a method for using an auxiliary pusher device for pushing a cart. The method comprises the steps of: attaching a grip element of the pusher device to a handle of the cart; and activating a motor of the pusher device causing the device to advance towards the cart while its chassis length extends and while its grip element pivots around the handle. The advance continues until the device touches the cart applying a force with a component vector in a direction substantially toward a front of the cart. In one embodiment of the method, the method further comprises a step of adjusting the height of the grip element so that it may be releasably engaged to the handle of the cart.

In another embodiment of the method, the method further comprises a step of using a card reader to read a user card and debiting an account of the user for use and rental of the device and then releasing the device for use from a parking station. In some instances of this embodiment the card reader debits the account of the user and the device is freed from a locking mechanism and available for use by the user.

BRIEF DESCRIPTION OF THE DRAWINGS

The invention is herein described, by way of example only, with reference to the accompanying drawings. It is stressed that the particulars shown are by way of example and for purposes of illustrative discussion of the preferred embodiments of the present invention only. The drawings are presented with the intention of providing what is believed to be the most useful and readily understood description of the principles and conceptual aspects of the invention. In this regard, no attempt is made to show structural details of the invention in greater detail than is necessary for a fundamental understanding of the invention. The description taken with the drawings make apparent to those skilled in the art how the several forms of the invention may be embodied in practice.

In the drawings.

Similar elements in the Figures are numbered with similar reference numerals.

DESCRIPTION OF PREFERRED EMBODIMENTS

It should be noted that throughout this document all data is exemplary. It is used solely to present and explain the invention and as a possible implementation of the invention and is not intended to limit the invention. Similarly, the present invention has been described in relation to particular embodiments which are intended in all respects to be illustrative rather than restrictive.

As used herein "comprising" or "comprises" or variants thereof is to be interpreted as specifying the presence of the stated features, integers, steps, or components as referred to, but does not preclude the presence or addition of one or more features, integers, steps, or components, or groups thereof. Thus, for example, a method comprising a given step or any number of steps may contain additional steps.

The present invention provides an auxiliary pusher device to assist in pushing carts generally, but without limiting the invention, shopping carts. Inter alia, this device is designed to assist the aged or infirm in conveying their purchases to the checkout lines of supermarkets without needing to modify or replace existing types of carts. It also is intended to assist in extending a customer's stay in the supermarket until the customer has completed all his intended purchases. It is contemplated that the device will also reduce accidental injuries among shoppers.

While being discussed in terms of shopping carts used in food markets it is readily apparent that the device inter alia can be used in other venues, such as airports and train stations, where similar carts are regularly used to move luggage.

Figure 1A:
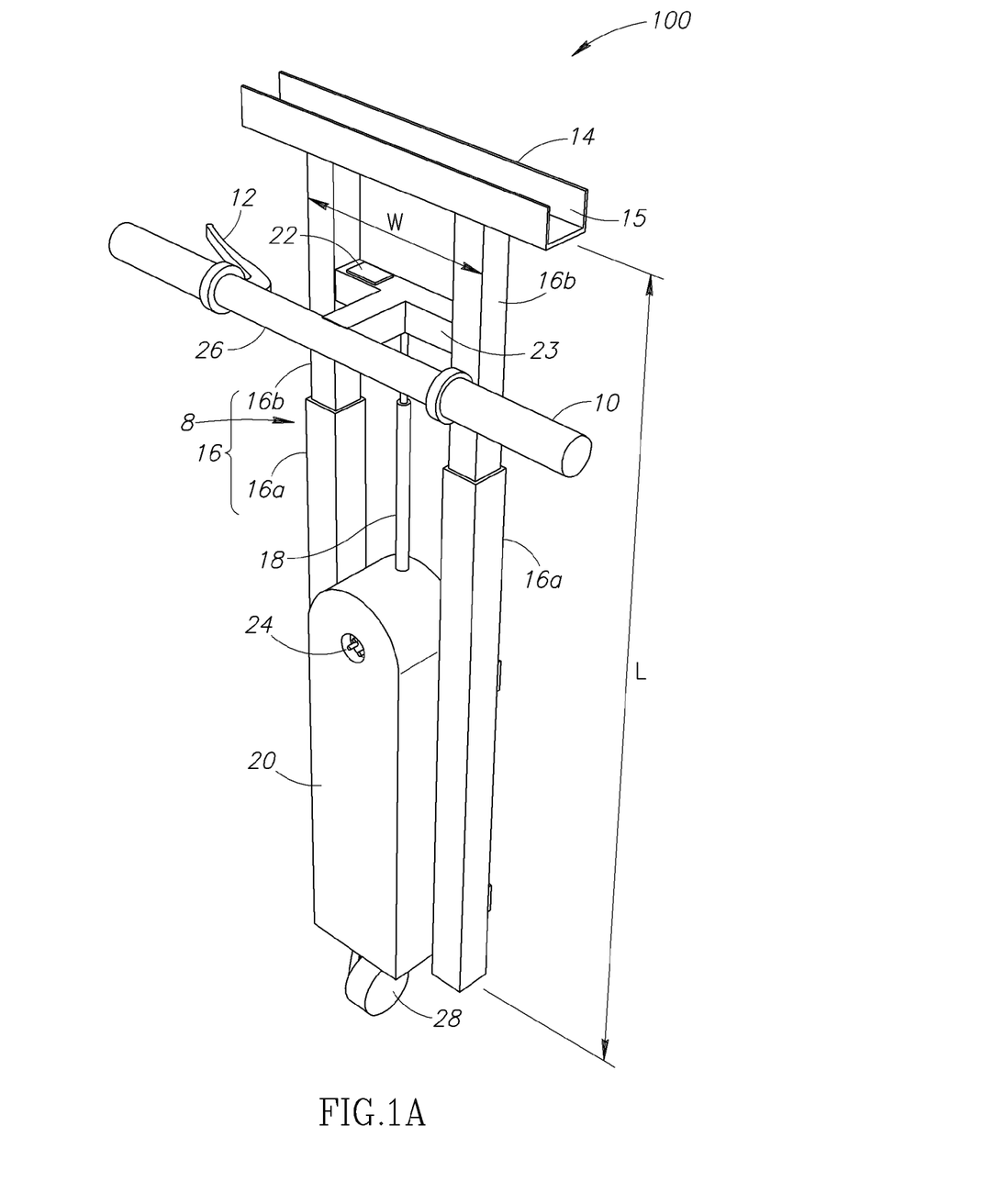
FIGS. 1A-1B are isometric back and front views of an auxiliary pusher device constructed and operative in accordance with an embodiment of the present invention.
Figure 1B:
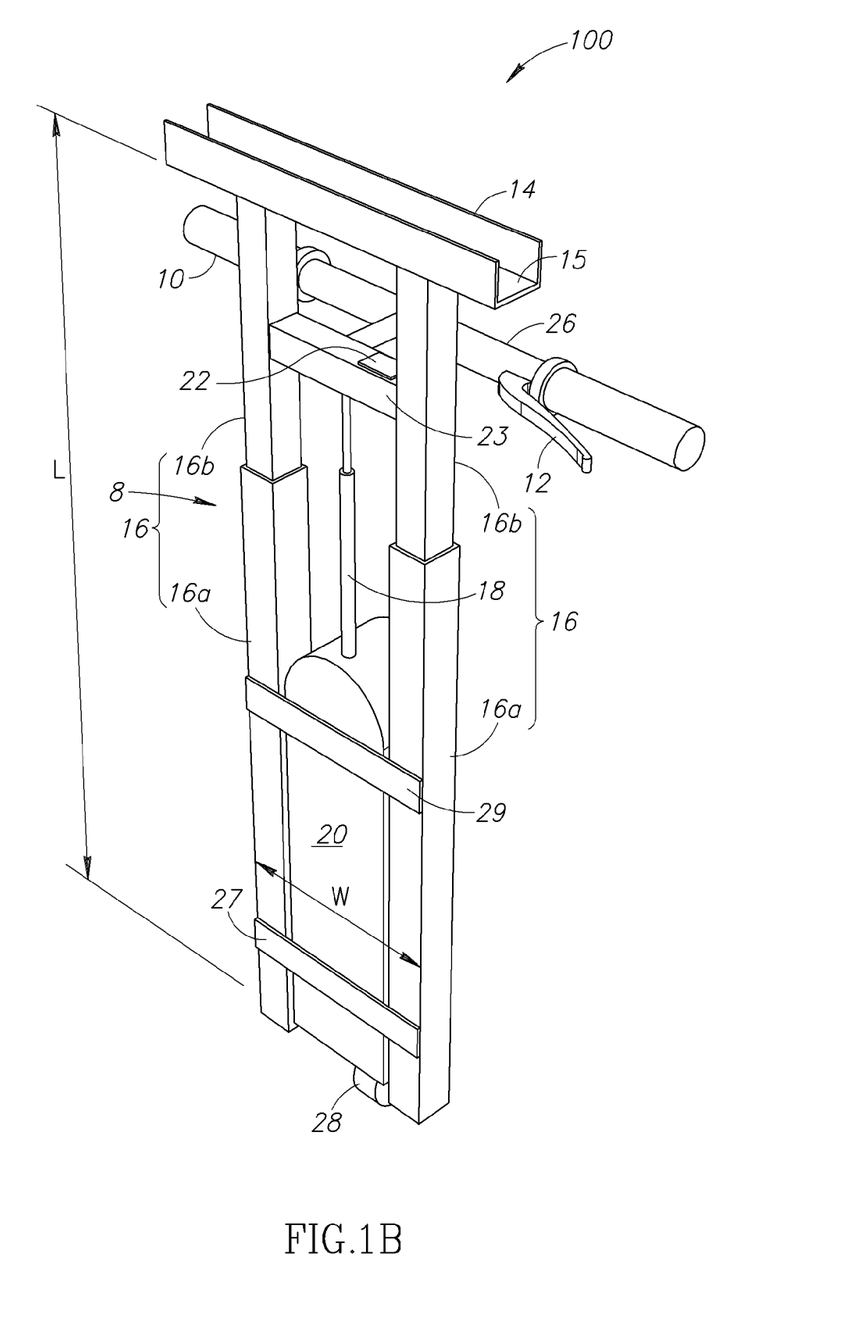
Figure 1C:
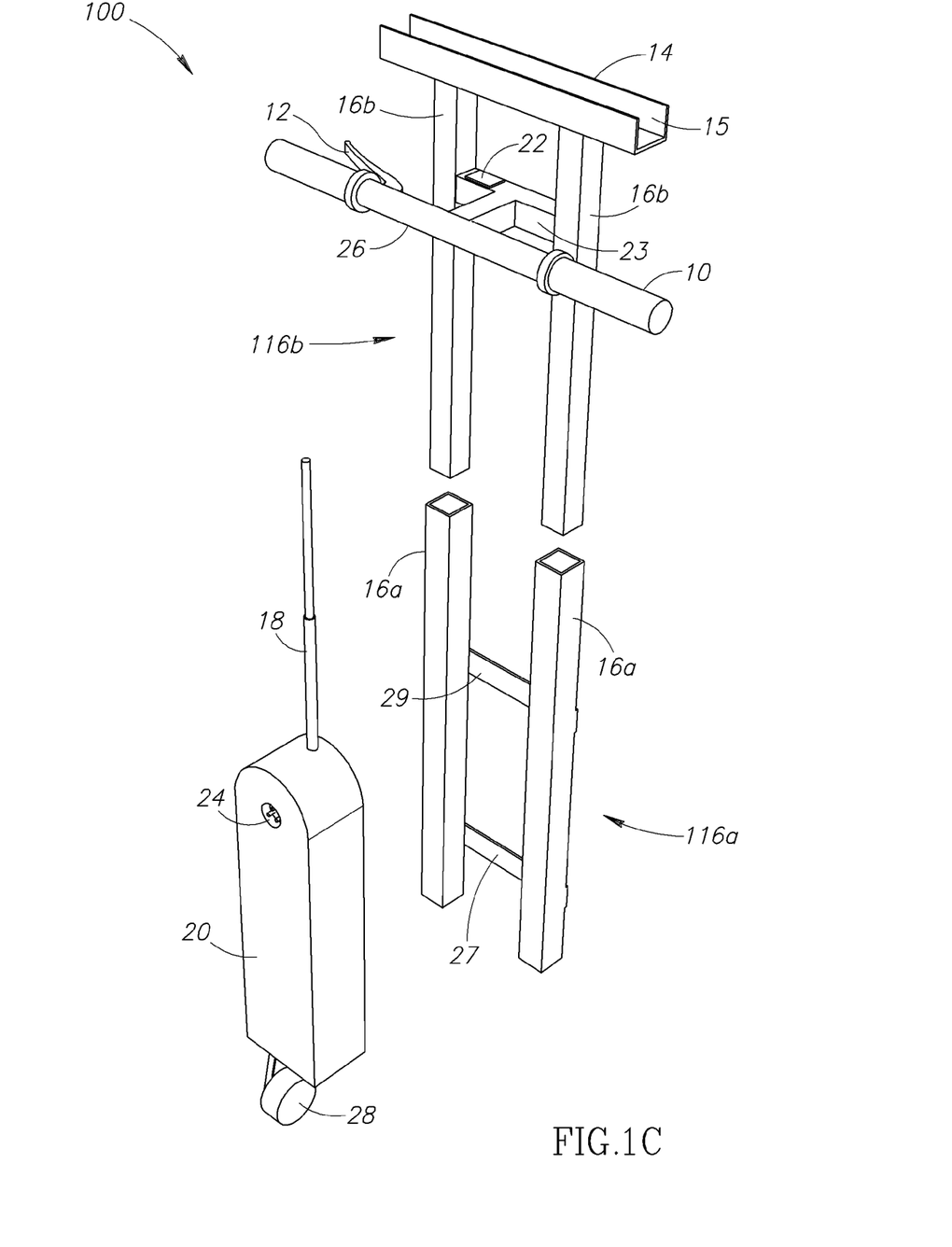
FIG. 1C is an exploded view of the device in FIG. 1A.
Figure 4:
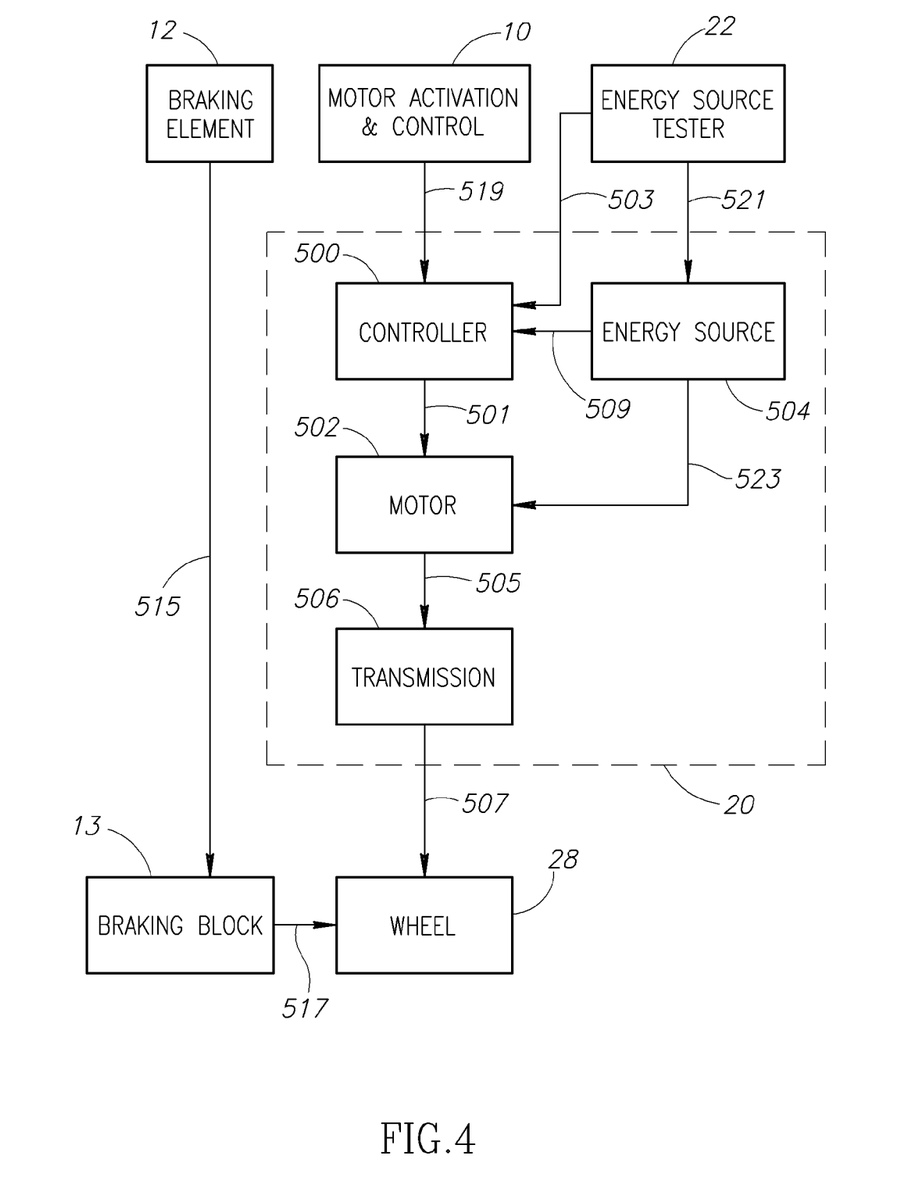
FIG. 4 is a schematic block diagram of the operating elements of the device represented as a system.

FIGS. 1A, 1B and 1C, to which reference is now made, show a back view, a front view and an exploded view, respectively, of a device 100 of the present invention. FIG. 4 is also referred to and it schematically shows the operative elements of the device configured as a system.

Device 100 comprises a variable length chassis 8, typically, but without intending to limit the invention, a substantially rectangular chassis having lower 116a and upper 116b portions, the latter defined immediately below. Length sides 16 of chassis 8 may have a telescopic construction formed of hollow bars having predetermined dimensions so that each of a first pair (upper/top pair) 16b of these hollow bars can slide into its respective associated lower bar from among a second pair (lower/bottom pair) 16a of hollow bars. These bars are matable with each other with bars 16a being the female members while bars 16b are the male members. These bars may also have any of many shapes such as, but without intending to limit the invention, a square, a rectangular or a round shape. It should be apparent to persons skilled in the art that other configurations and constructions of these elements may be used to obtain the automatically adjustable chassis length required by the invention. The description of the present invention herein contemplates the use of all configurations and constructions that allow such adjustability.

For greater clarity the following terms and definitions will be used relating to the structure of device 100 discussed herein.

Chassis 8 comprises two portions, a lower portion 116a of the chassis and an upper portion 116b of chassis 8. The lower portion 116a of the chassis comprises a pair of hollow bars 16a discussed above and struts 27 and 29 discussed immediately below. The upper portion 116b of the chassis comprises a pair of hollow bars 16b discussed above and strut 23 discussed immediately below.

Each length side 16 of chassis 8 is comprised of one of bars hollow 16a and one of bars 16b, these bars being slidably associated with their respective mates to define a variable length L of chassis 8. L is indicated in FIGS. 1A and 1B.

FIG. 1C shows upper portion 116b of chassis 8 separated from lower portion 116a of the chassis. In FIG. 1C, upper pair of bars 16b has completely slid out of hollow lower pair of bars 16a.

Preferably, upper pair of bars 16b is connected by an upper strut 23, while lower pair of bars 16a is connected by at least a lower strut 27. It should be apparent to persons skilled in the art that the number of struts may be varied and typically depend on the strength required for device 100. Typically, but without intending to limit the invention, the lower pair of hollow bars 16a are held substantially parallel to each other by their one or more struts. Similarly, upper pair of hollow bars 16b are held substantially parallel to each other by their one or more struts.

A drive wheel 28 is disposed and attached to device 100 at the bottom or alternately denoted as the lower end, and also at times alternately denoted herein as the second end, of chassis 8. A suitable electric motor 502 (FIG. 4) disposed within a housing 20 mounted onto chassis 8, is provided to drive drive wheel 28. In the Figures and discussion herein, the drive wheel is discussed in the singular although a plurality of drive wheels is also contemplated as being usable within the scope of this invention. Drive wheel 28 is positioned so as to extend beyond chassis 8, thereby to engage a travel surface or floor along which a cart is to be pushed.

Motor 502 (not shown in FIGS. 1A, 1B and 1C but schematically shown in FIG. 4) is herein positioned in a housing 20 which is directly attached to chassis 8. Housing 20 is shown as positioned between the lower hollow bars 16a of chassis length sides 16. In other embodiments, housing 20 may be positioned elsewhere on chassis 8. In addition to motor 502, housing 20 contains within it a transmission 506 (FIG. 4), an energy source, typically a battery 504 (FIG. 4), and a controller 500 (FIG. 4), the latter controlling the motor. In another embodiment, any or all of these elements may be positioned separately but interconnected mechanically or electrically as required. They may be affixed directly to other parts of chassis 8 without use of a housing. Their method of attachment to chassis 8 and their mechanical and electrical connections may be by any method known to a person having ordinary skill in the art.

As schematically shown in FIG. 4, drive wheel 28 is positioned and constructed to be in mechanical communication with transmission 506 which in turn is in mechanical communication with motor 502. Energy source 504 provides energy to motor 502. The configuration and nature of the mechanical and electrical connections required for the elements in housing 20 (not shown in FIGS. 1A, 1B and 1C but schematically indicated in FIG. 4) would be readily apparent to persons skilled in the art. A large number of different configurations of the elements and the mechanical and electrical connections shown in FIGS. 1A, 1B, 1C, and 4 are possible.

Controller 500 besides controlling electrical motor 502 is also in electrical communication with motor activation and control element 10, the latter discussed below. This electrical connection also may be readily constructed by persons with knowledge in the art. Accordingly, as the mechanical and electrical connections and configurations, per se, can take many different but well-known forms, they are neither shown in detail in the Figures nor discussed in detail in the text.

In accordance with an embodiment of the invention, energy source 504 typically is a battery, most often a rechargeable battery. Recharging may be implemented, for example, by providing an electrical connector point such as a socket 24 or the like in the battery. In the embodiment of FIGS. 1A, 1B and 1C, housing 20 may include a socket 24 which allows for recharging the battery positioned within housing 20 using an external energy source. It should be apparent that recharging from an external energy source may often require a voltage converter (not shown) to deliver energy with the proper voltage needed by a specific energy source, such as a battery.

In some embodiments, electrical motor 502 may be a DC motor which would allow backward as well as forward motion.

A grip element 14 is mechanically attached to the top or upper bars 16b and element 14 effectively defines the top of or alternatively the upper end of, or at times alternately denoted herein as the first end of, chassis 8. The length of grip element 14 is typically, but without intending to limit the invention, longer than the width dimension W of chassis 8. Width dimension W of chassis 8 is indicated on FIGS. 1A and 1B. Grip element 14 may be connected to the top of hollow bars 16b by any of many ways known to persons skilled in the art such as, but not limited to, welding, soldering or screwing. In some embodiments, it is contemplated that grip element may be integrally formed with upper bars 16b.

Grip element 14 may have any configuration suitable for releasable attachment to the handle of a cart. In FIGS. 1A, 1B and 1C, grip element 14 has a hollow U-shape construction with trench 15 adapted for snapping onto, and unsnapping from, the handle of a cart. It is readily understood by persons skilled in the art that other shapes and lengths of the grip element may be used as long they are adapted for sturdy releasable attachment to the handle of a cart.

Upper strut 23 lies athwart slidable upper bars 16b of device 100. To strut 23, a hand grip 26 is attached which may be longer than the width dimension W of chassis 8. It is readily apparent that in other embodiments, hand grip 26 may be directly attached to the pair of upper bars 16b. The length of hand grip 26 may be determined by the maneuverability required for controlling the carts being pushed by device 100.

Figure 3:
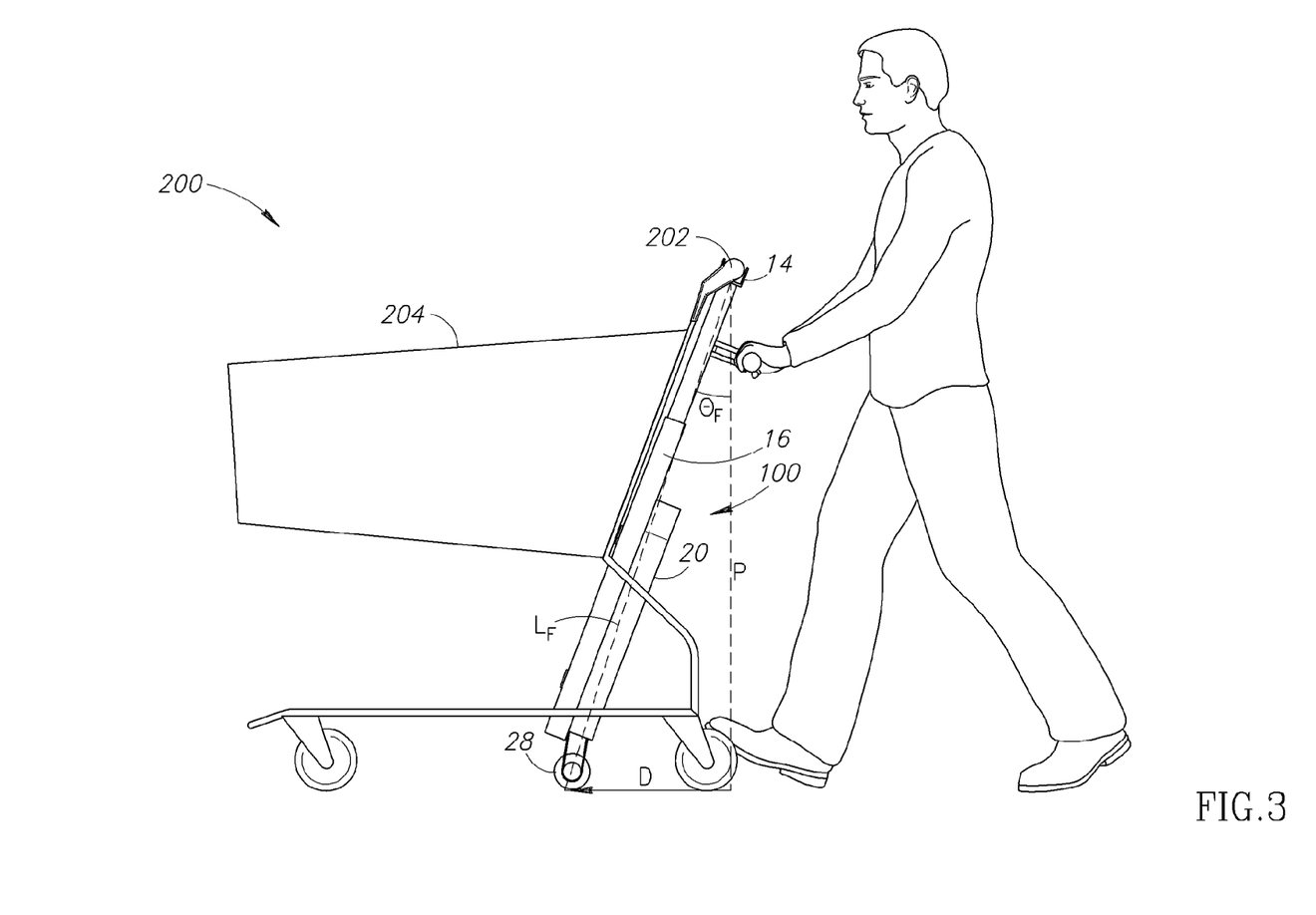
FIG. 3 is a side view of the device of the present invention when in use.

The side of device 100 on which hand grip 26 projects from chassis 8 is herein defined as the back side of device 100. Alternatively, the back side of device 100 can be defined as the side of the device on which a user is usually positioned when operating device 100 as shown in FIG. 3. Similarly, the side opposite the back side is defined as the front side of device 100 and alternatively it can also be defined as the side that touches the cart as in FIG. 3.

A brake element 12, typically positioned adjacent to, or on, hand grip 26, is provided so as to engage drive wheel 28, thereby to prevent it from rotating.

Near the end of the second side of hand grip 26 is a motor activation and control element 10 in electrical communication with controller 500 or, in some embodiments, directly in electrical communication with motor 502 (both shown schematically in FIG. 4) positioned in housing 20. Element 10 activates or deactivates motor 502 of device 100 and modulates the speed or power of the device. Brake element 12 may be a braking lever while motor activation and control element 10 may be a twist grip throttle similar to those used on motorcycles, with the introduction of suitable simple modifications readily effected by persons skilled in the art.

A compressive element 18 is disposed between the upper 116b and lower 116a portions of chassis 8 as defined above and shown in FIGS. 1A, 1B and 1C. In the embodiment shown in FIGS. 1A and 1B, it could, without intending to limit the invention, typically be positioned between, and in mechanical communication with, upper strut 23 and housing 20. Compressive element 18 is biased so as to push upper portion 116b of chassis 8 in a direction generally away from the drive wheel end of chassis 8, so that grip element 14 may firmly, but releasably, engage with a handle of a cart.

Compressive element 18 in the Figures is shown as a piston element which may be a spring activated piston, a hydraulic activated piston, or a pneumatic activated piston. It should be apparent to one skilled in the art that any other functionally equivalent element may also be used as a compressive element, for example, a spring alone.

From the description of device 100 above, a brief discussion of the method of attachment of device 100 to a cart can now be provided. After a user has selected a cart, the user depresses compressive element 18 in a direction toward drive wheel 28. The user then attempts to align the handle of the cart with grip element 14. Once there is substantial alignment, the user releases the compressive element allowing it to extend in the direction of the handle of the cart causing grip element 14 to engage with the handle. When the compressive element is released, strut 23 and grip element 14 rise until element 14 engages with the handle of the cart. The bias of the compressive element 18 keeps element 14 engaged with the cart's handle. It should be noted that among other reasons, the step of depressing compressive element 18 is required is because different carts, even different shopping carts, have handles at different heights above the ground.

Device 100 is formed of sturdy light-weight materials. For example, chassis 8 may be constructed of aluminum or a fiber reinforced plastic, while housing 20 may be made of a sturdy plastic or of a fiber reinforced plastic.

In another embodiment, pusher device 100 may also comprise a battery tester 22 to indicate when recharging or replacing a battery energy source is required.

In some embodiments, device 100 is used with a card reading system which may be used separately or in conjunction with a more extensive card reading system, such as a system used by a supermarket to charge purchases at the checkout/cashier's station. When a card is swiped or otherwise read by the card reader, the user's account is debited for use and rental of device 100. After completion of shopping, the user returns device 100 and has his card again read by the system. The system then credits his account for the returned device.

In order to simplify FIGS. 1A and 1B, the mechanical braking cable 515 (FIG. 4) activated by braking element 12 and extending from element 12 into housing 20 or passing outside of housing 20 is not shown. The braking cable 515 ultimately connects to and activates a braking block 13 (FIG. 4) positioned adjacent to drive wheel 28 which acts to prevent rotation of the wheel. Additionally, in order to simplify and not clutter FIGS. 1A, 1B and 1C, electrical connection 519 (FIG. 4) extending from motor activation and control element 10 into housing 20 where it is in electrical communication with controller 500 is not shown. Rather the connectivity of these parts, mechanical and/or electrical, are shown schematically in FIG. 4 and discussed more fully below.

Figure 2A:
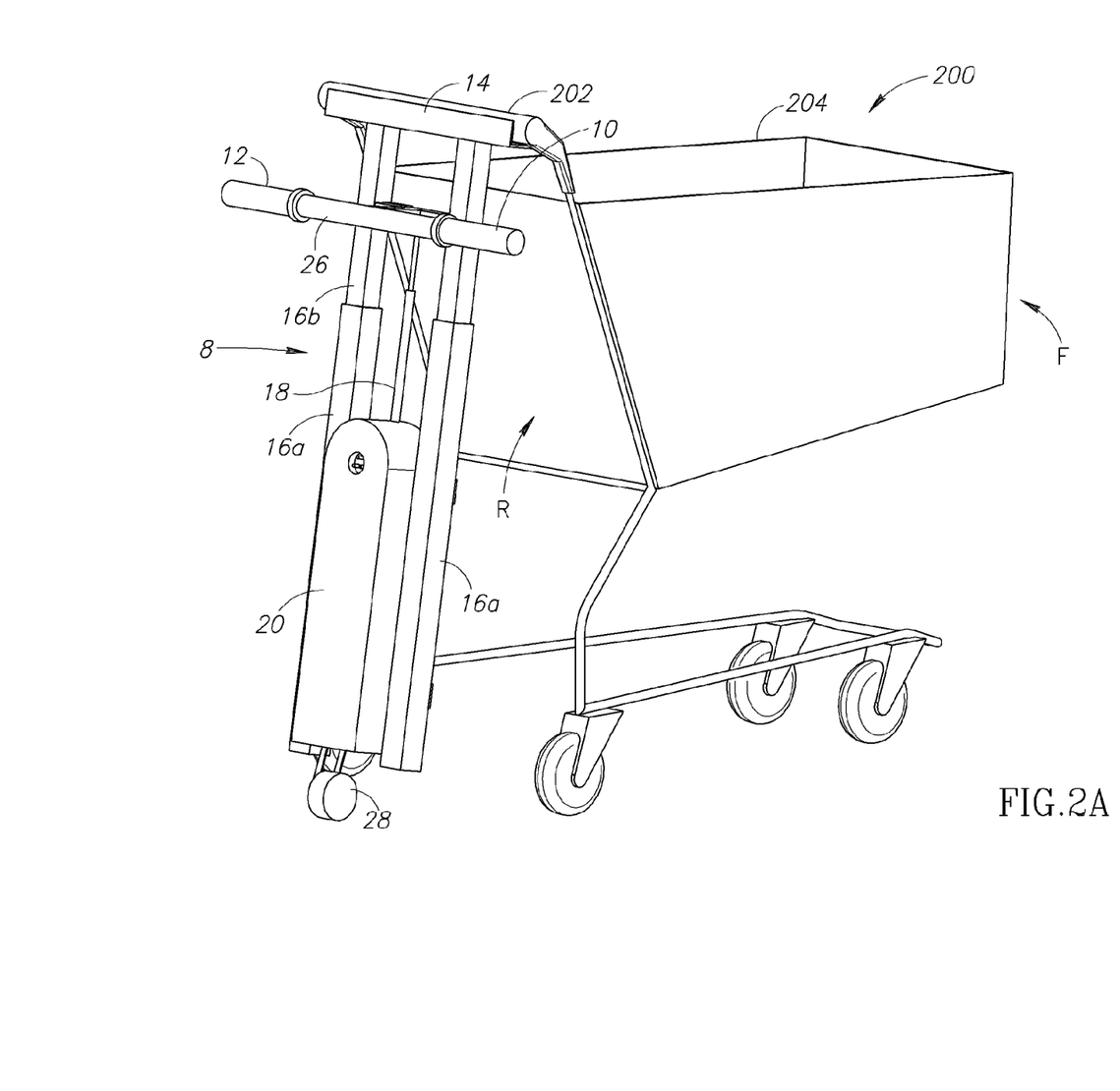
FIGS. 2A and 2B are isometric views of the device of the present invention in respective pre-activation and post-activation positions with reference to a cart being pushed.
Figure 2B:
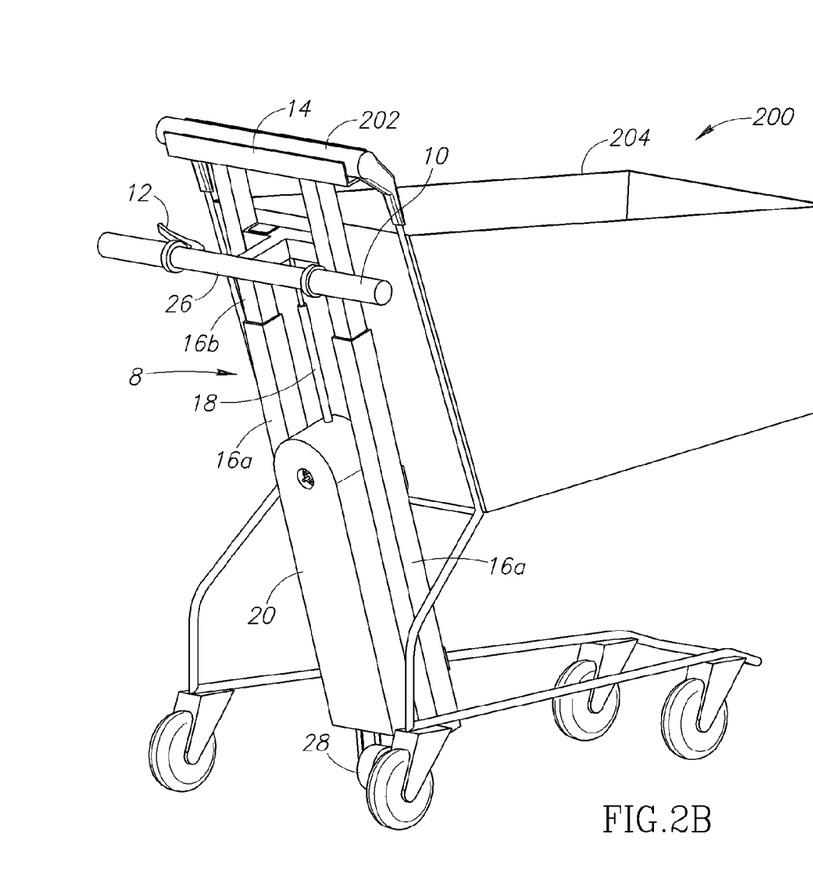

Turning now to FIGS. 2A and 2B, the position of device 100 is shown attached to cart 200 before activation and after activation of its motor, respectively. In FIG. 2A, R and F indicate the rear and front ends of cart 200, respectively.

FIG. 2A shows grip element 14 attached to a handle 202 of a cart 200 prior to activation of the motor of device 100. It can reasonably be posited that at this stage the reactive force of handle 202 is equal to and opposite to the force provided by compressive element 18. Both act along a substantially perpendicular line P from the handle of the cart to the ground. In FIG. 2A, that is prior to activation of device 100, essentially all of the force of the handle on device 100 is vertical and the angle, angle shown in FIGS. 2C and 3, formed by the length of device 100 with respect to perpendicular line P is substantially 0°. The length of perpendicular line P substantially equals the length L of device 100 when device 100 is attached to handle 202 of cart 200 and is not activated.

After motor 502 (FIG. 4) of device 100 is activated, the device advances in a direction toward basket 204 of cart 200. As device 100 advances, grip element 14 remains engaged with and pivots around handle 202 of the cart, and angle θ, best seen in FIG. 3, increases. As device 100 advances, its chassis length L automatically extends. This is a result of bars 16b sliding out of their associated bars 16a in a direction away from wheel 28 under the effect of the drive force provided by motor 502.

After the motor is activated, transmission 506 (FIG. 4) of device 100 causes the device to advance toward basket 204 of cart 200, while angle θ increases as discussed above. The drive force generated by motor 502 (and transferred by transmission 506 to wheel 28) provides a force component in the direction toward basket 204 of cart 200.

In FIG. 2B, device 100 is shown touching and leaning up against cart 200, pushing it while still connected to handle 202 of cart 200. Angle θ, formed by perpendicular line P from the handle of the cart to the ground and the extended length of device 100 from its grip element 14 to its wheel 28, has a value, $\theta_F$ when device 100 leans up against and pushes cart 200. At that point, the length of device 100 is $L_F$, where $L_F > L$ and where L is the original pre-activation length of device 100.

Figure 2C:
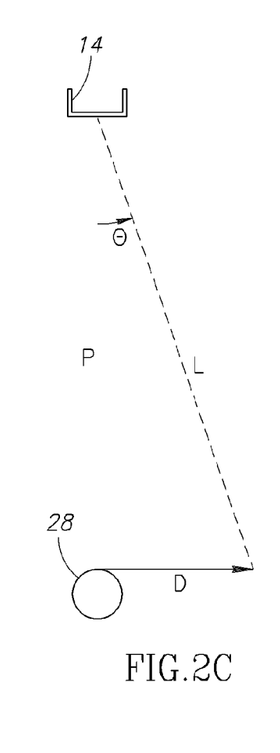
FIG. 2C is a schematic illustration of the angular rotation, length increase and distance advanced by a device after a motor of the device is activated.

FIG. 2C, to which reference is now made, illustrates schematically what happens when device 100 advances from its pre-activated position as in FIG. 2A to its activated extended position as in FIG. 2B. L represents the distance from grip element 14 to wheel 28 of device 100 when grip handle 14 is attached to the handle 202 of cart 200. P represents a perpendicular line from cart handle 202 to the ground. D represents the distance that wheel 28 of device 100 advances as it moves from the device's pre-activation position (FIG. 2A) to the position where it touches and pushes the cart (FIG. 2B). When device 100 has reached and is touching and pushing cart 200, angle θ has increased from a value of about 0° to a final value of $\theta_F$. Similarly, the length of device 100 has increased from L, its original length, to $L_F$ its "final extended length".

FIG. 3 is a side view of the situation in FIG. 2B and it more clearly shows sloping device 100 touching the back of cart 200 pushing it. It also better shows angle θ, here $\theta_F$, which has increased after device 100 is activated and moves from its pre-activation position to its post-activation pushing position.

FIG. 4, to which reference is again made and a fuller description thereof is now provided, schematically indicates the connectivity, either mechanical or electrical as needed, between the operating elements of device 100.

Housing 20 comprises controller 500 in electrical communication with energy source 504 and motor 502 via electrical connections 509 and 501 respectively. Energy is supplied to controller 500 from energy source 504 via electrical connection 509.

Controller 500 is also in electrical communication with motor activation and control element 10 positioned outside housing 20, element 10 indicating when to activate and deactivate motor 502 and when to increase the speed or power of device 100. Element 10 is in electrical communication with controller 500 by electrical connection 519. Controller 500 controls motor 502 based on input received from element 10.

FIG. 4 indicates that the energy provided to motor 502 is received from energy source 504 via electrical connection 523.

If an optional energy source tester 22 is used, for example a battery tester element when energy source 504 is a battery, element 22 provides information to controller 500 via electrical connection 503 indicating when energy source 504 needs recharging or replacing. Controller 500 then can activate an indicator (not shown) that would indicate the need for recharging or replacing the energy source. Tester 22 is in electrical communication with energy source 504 by electrical connection 521 through which the voltage of source 504 is tested.

Motor 502 is in mechanical communication with transmission 506 which in turn is in mechanical communication with drive wheel 28 causing the latter to rotate. Such communication may be effected as is well-known in the art by any of many different possible mechanical connection configurations and methods, such as gears, shafts, belts and the like. These are represented in FIG. 4 by mechanical connections 505 and 507, respectively. Any of such configurations and methods would allow device 100 to advance in the direction of cart basket 204 as discussed above.

Braking element 12 is in mechanical connection typically via a cable 515 to a braking block 13 abutting drive wheel 28. When braking element 12 activates cable 515, braking block 13 is operative to prevent drive wheel 28 from rotating.

As noted above, many possible methods of connection and communication between the elements in FIG. 4 are well-known to those skilled in the art. Accordingly, these methods are not being discussed in greater detail.

Figure 5A:
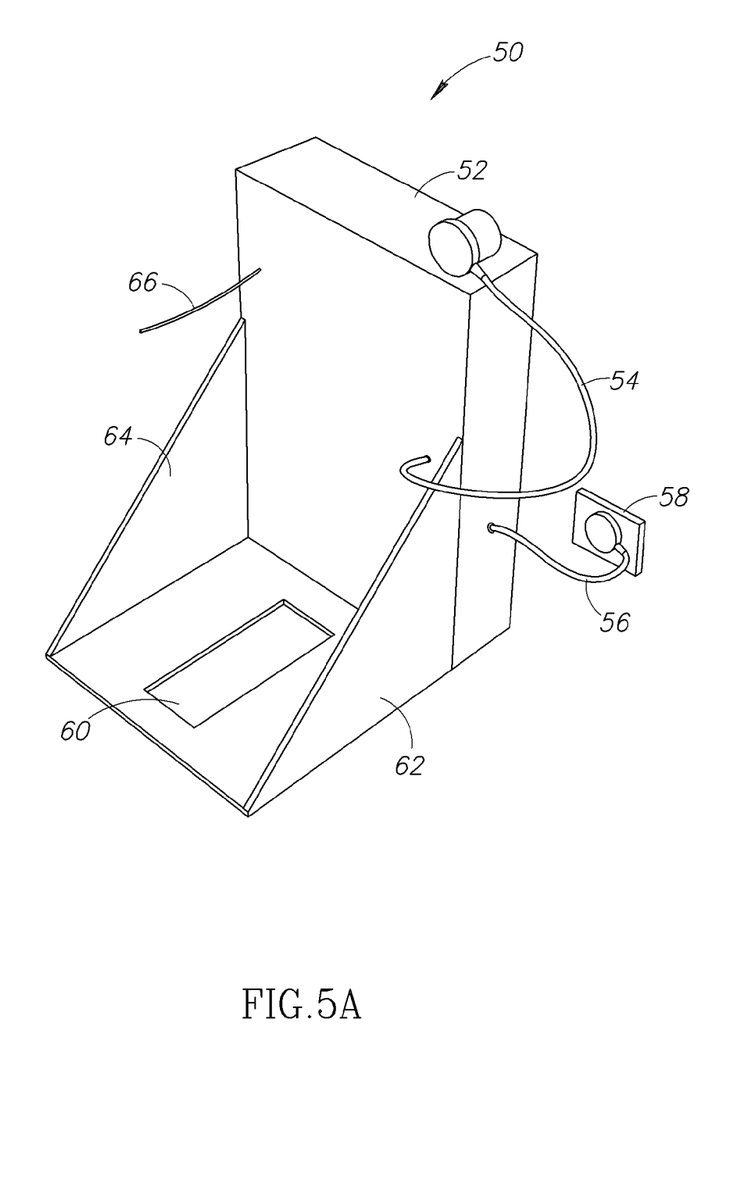
FIG. 5A is a top isometric view of a parking station for use with the device of the present invention.
Figure 5B:
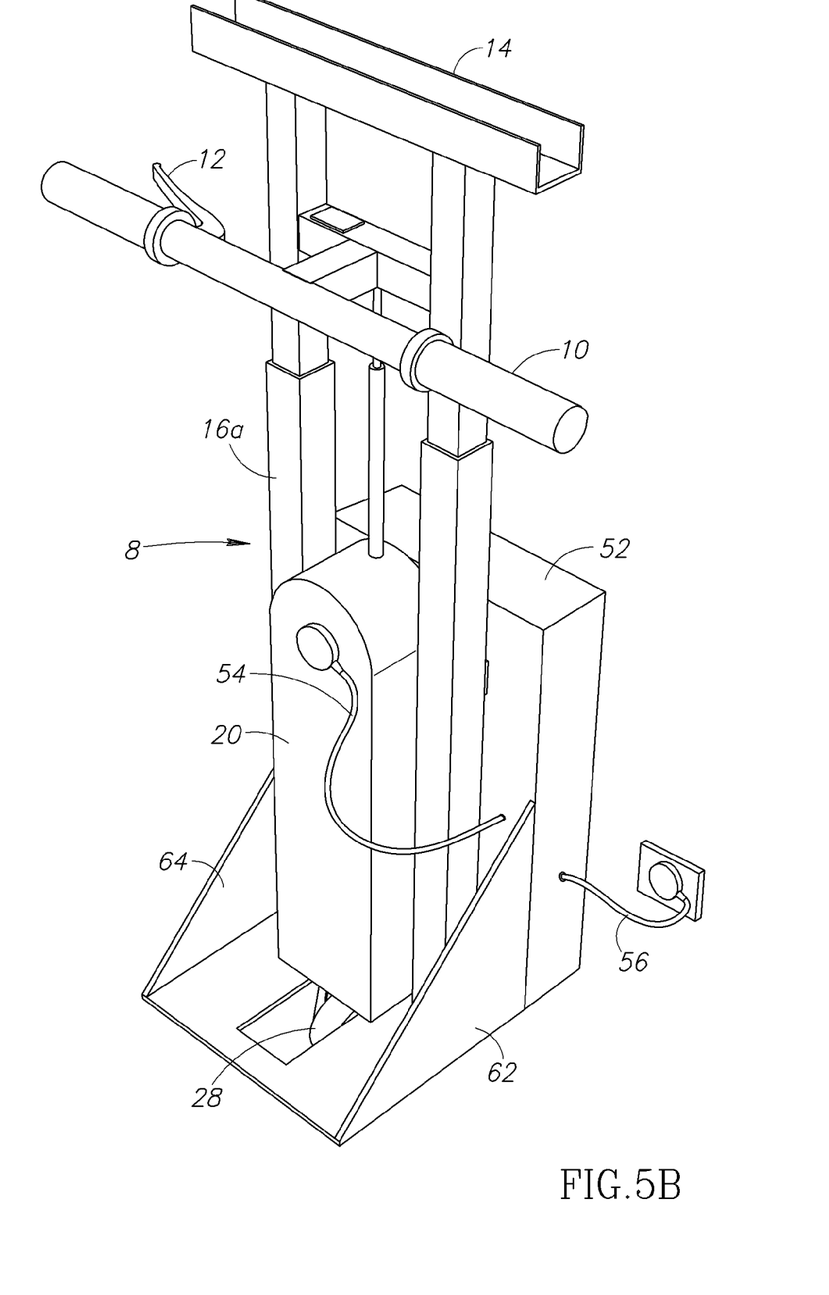
FIG. 5B is a view of a device being stored in the parking station shown in FIG. 5A.

Reference is now made to FIGS. 5A and 5B where a parking station 50 usable with device 100 is shown. The station is also shown as having optional recharging capability. Parking station 50 is comprised of three sides 52, 62 and 64 between which pusher device 100 may be placed. In some embodiments, the sides may be constructed as solid walls while in others the walls may have an open divider construction similar to many bicycle racks. With any of the contemplated constructions of station 50, device 100 is sufficiently restrained within the three walls 52, 62, and 64 of station 50 so that it cannot fall or be knocked over.

Station 50 may also be adapted to be pluggable into an external source of energy such as a wall socket 58 and then further adapted to transfer the energy by a wire plug 54 insertable into socket 24 (FIG. 1) of device 100.

In some embodiments, parking station 50 may also comprise an optional locking mechanism 66, schematically shown in FIG. 5A, to lock device 100 into station 50. Station 50 may be in electronic communication with a card reader system (not shown) as described above. Device 100 may be automatically freed from locking mechanism 66 by the card reader system after the user's card and/or customer's account has been debited for use and temporary rental of the device. Once the user has returned the device to parking station 50, the card reader reads either the user's card or an identification number permanently attached to device 100 is read by the system. As a result the provisional rental charge, effectively equivalent to a returnable deposit, is returned via an automatic credit to the user's card and/or customer's account by the card reader system.

Figure 6:
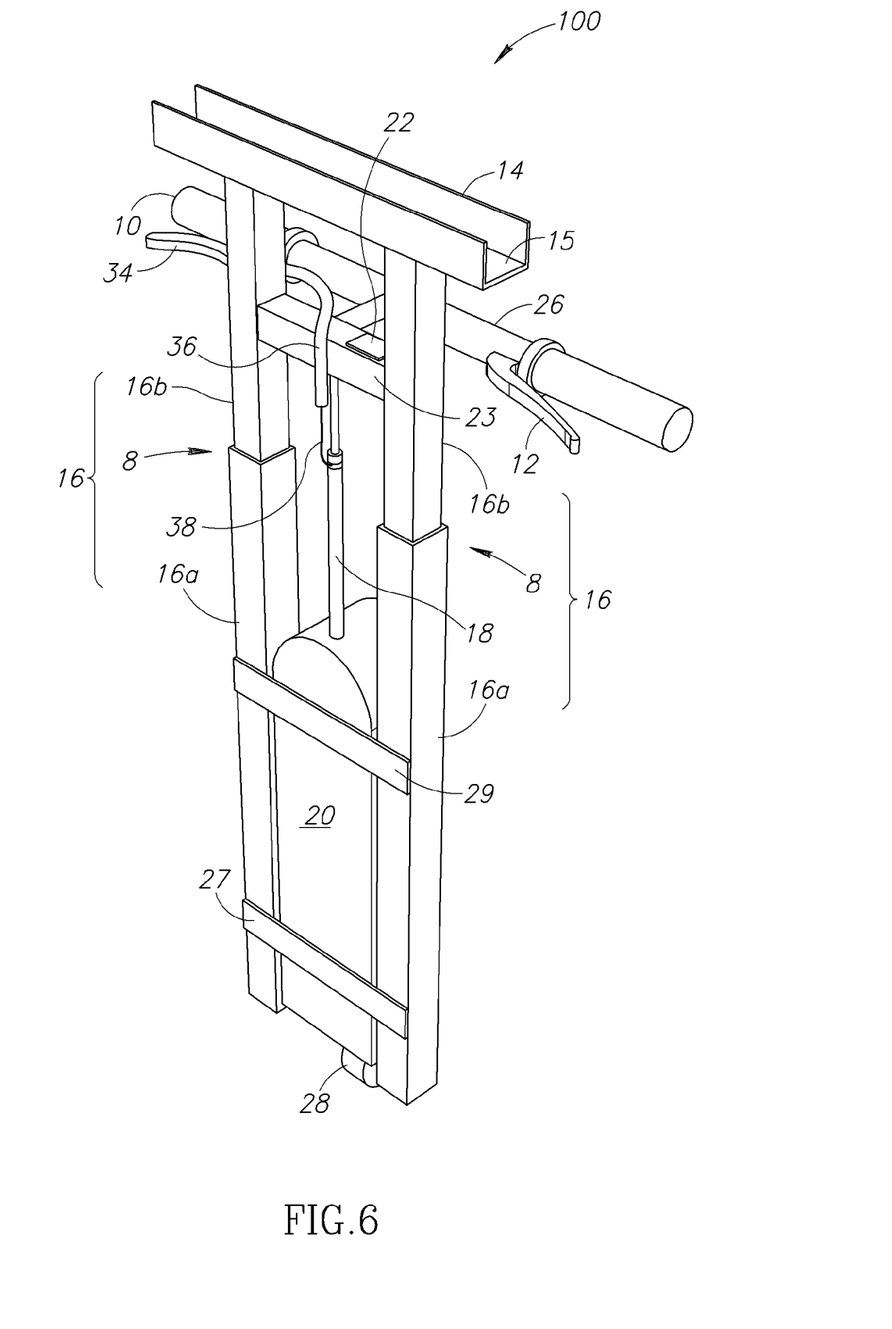
FIG. 6 shows a mechanism for ease of adjustment of the grip element of the device of the present invention.

Another embodiment of device 100 is shown in FIG. 6 to which reference is now made. The embodiment of FIG. 6 is similar to the embodiment of FIGS. 1A-1C but with the addition of a steel cable 38, flexible lead 36 and a spring cable lever 34.

When using the device shown in FIG. 6, a user manually depresses compressive element 18 in the direction of drive wheel 28, before attaching grip element 14 to the handle of a cart. Lever 34 may be used to hold compressive element 18 and spring cable 36 in their compressed states until substantial alignment of grip element 14 and the handle of the cart has been achieved. Once grip element 14 is substantially aligned with the handle of a cart by the user, lever 34 is activated and it acts as a release lever causing extension of spring cable 36 and compressive element 18, the latter pushing grip element 14 in a direction to engage with handle. The embodiment of device 100 in FIG. 6 makes engagement of grip element 14 with the handle of the cart easier for many shoppers, particularly the aged, sick or infirm.

A method for using an auxiliary pusher device for pushing a cart which comprises the steps of:
attaching a grip element of the pusher device to a handle of the cart; and
activating a motor of the pusher device causing the device to advance towards the cart while its chassis length extends and while its grip element pivots around the handle, the advance continuing until the device touches the cart, thereby applying a force with a component vector in a direction toward a front of the cart.

In some embodiments of the method, the method may also include a step of adjusting the height of the grip element so that it may be releasably attachable to the handle of the cart.

In some embodiments of the method, the method further includes a step of using a card reader to read a user card and to debit the card for use and temporary rental of the device.

In some embodiments of the method, the method may further include a step of releasing the device from a locking mechanism by use of a card reader.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. Therefore, it will be appreciated by persons skilled in the art that the present invention is not limited by what has been particularly shown and described herein above. Rather, the scope of the invention is defined by the claims that follow.

What is being claimed is:

1. An auxiliary pusher device for pushing a wheeled cart along a travel surface, the cart having rear and front ends and a rearwardly extending handle for pushing the cart, wherein the device comprises:
    an adjustable length chassis having first and second ends;
    a grip element connected to said first end of said chassis for engaging and gripping the handle of the cart;
    a drive wheel connected to said second end of said chassis, adapted to frictionally engage the travel surface;
    a selectably operable motor drivably engaged with said drive wheel which, when activated, is operative to apply a drive force to said drive wheel, thereby applying a corresponding drive force to said chassis and via said grip element to the cart, the drive force including a force component substantially parallel to the travel surface, thereby causing the cart to travel therealong; and
    a hand grip connected to said chassis for guiding the direction of travel of the cart,
    wherein said device, when activated, advances in the direction of the cart until touching it, thereby causing a component of said drive force to act on the cart and when advancing toward the cart there is a resulting increase in chassis length and an increase in an angle formed by said chassis length with a perpendicular line from the handle of the cart to the travel surface.

2. A device according to claim 1, wherein after activating said motor, said length of said chassis is of a varying length depending on the distance said device wheel has advanced in the direction of the cart after activating said motor.

3. A device according to claim 1, further comprising a compressive element in mechanical communication with said grip element and operative to exert a force on and releasably engage said grip element with the handle of the cart.

4. A device according to claim 3, wherein said compressive element is selected from a group consisting of: a hydraulic piston element, a pneumatic piston element, and a spring.

5. A device according to claim 1, further comprising a motor activation and control element in electrical communication with a controller, said motor activation and control element activating, deactivating and modulating the operation of said motor and the speed or power of said device.

6. A device according to claim 5, wherein said motor activation and control element is positioned on said hand grip and is a twist grip throttle.

7. A device according to claim 1, further comprising a braking element in mechanical communication with said drive wheel, said braking element adapted for preventing rotation of said drive wheel.

8. A device according to claim 1, wherein said adjustable length chassis is formed of upper and lower chassis portions arranged for mutual telescopic adjustment.

9. A device according to claim 1, wherein said device further comprises a controller and an energy source for providing energy to said motor and said controller, said controller in electronic communication with said motor, said energy source and a motor activation and control element and said controller controlling said motor and said energy source.

10. A system for parking an auxiliary pusher device, comprising:
    an auxiliary pusher device for pushing a wheeled cart along a travel surface, the cart having rear and front ends and a rearwardly extending handle for pushing the cart, wherein the device comprises:
    an adjustable length chassis having first and second ends;
    a grip element connected to said first end of said chassis for engaging and gripping the handle of the cart;
    a drive wheel connected to said second end of said chassis, adapted to frictionally engage the travel surface;
    a selectably operable motor drivably engaged with said drive wheel which, when activated, is operative to apply a drive force to said drive wheel, thereby applying a corresponding drive force to said chassis and via said grip element to the cart, the drive force including a force component substantially parallel to the travel surface, thereby causing the cart to travel therealong; and
    a hand grip connected to said chassis for guiding the direction of travel of the cart; and
    a parking station comprising walls on three sides configured so that when said pusher device is positioned within said parking station said device is prevented from falling or being knocked over; and
    a card reader which is adapted to read a card of a user and a locking mechanism for locking said device, said locking mechanism in electronic communication with said card reader, said device released for use from said locking mechanism when said card reader reads the card of a user and the user has been charged for use and rental of the device by said card reader.

11. A system for parking according to claim 10, wherein said parking station is adapted to connect to an external electric outlet and also, after any necessary voltage conversion by a voltage converter, to connect to an energy source of said pusher device thereby recharging said energy source.

12. An auxiliary pusher device for pushing a wheeled cart along a travel surface, the cart having rear and front ends and a rearwardly extending handle for pushing the cart, wherein the device comprises:
    an adjustable length chassis having first and second ends;
    a grip element connected to said first end of said chassis for engaging and gripping the handle of the cart;
    a drive wheel connected to said second end of said chassis, adapted to frictionally engage the travel surface;
    a selectably operable motor drivably engaged with said drive wheel which, when activated, is operative to apply a drive force to said drive wheel, thereby applying a corresponding drive force to said chassis and via said grip element to the cart, the drive force including a force component substantially parallel to the travel surface, thereby causing the cart to travel therealong;
    a hand grip connected to said chassis for guiding the direction of travel of the cart;

a card reader system mounted on said chassis for debiting a user card for use and rental of said device, said card reader in communication with a customer account debiting system of a business entity; and a locking mechanism integrated with said card reader system, wherein when a user card is read by said card reader, said card reader debits the user's customer account for use and rental of the cart and also releases said device from said locking mechanism permitting use of said device.

13. A device according to claim 12, further comprising an energy source comprising at least one battery and a battery tester in electrical communication with said at least one battery for determining when said at least one battery needs recharging or replacing and indicating such.

14. A device according to claim 12, wherein said drive wheel is a plurality of drive wheels.

* * * * *